United States Patent
Foster et al.

(10) Patent No.: US 6,349,988 B1
(45) Date of Patent: Feb. 26, 2002

(54) VEHICLE WITH LARGE PLANAR COMPOSITE PANELS

(75) Inventors: Steven Foster, Rochester Hills; Holly Giangrande, Troy, both of MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/570,714

(22) Filed: May 15, 2000

(51) Int. Cl.$^7$ ................................................. B60J 7/00
(52) U.S. Cl. ...................... 296/181; 296/183; 296/191; 296/901; 52/464; 52/270; 52/582.2; 52/463
(58) Field of Search ................... 296/181, 183, 296/191, 901; 52/464, 270, 582.2, 463

(56) References Cited

U.S. PATENT DOCUMENTS

| | | | |
|---|---|---|---|
| 3,712,005 A | * 1/1973 | Eschbach et al. | 52/210 |
| 4,221,426 A | * 9/1980 | Wardill | 296/178 |
| 5,042,395 A | * 8/1991 | Wackerle et al. | 296/191 |
| 5,140,913 A | * 8/1992 | Takeichi et al. | 296/191 |
| 5,403,062 A | * 4/1995 | Sjostedt et al. | 296/181 |
| 5,403,063 A | * 4/1995 | Sjostedt et al. | 296/187 |
| 5,584,527 A | * 12/1996 | Sitter | 296/181 |
| 5,588,268 A | * 12/1996 | Sterflinger et al. | 52/236.7 |
| 5,635,306 A | * 6/1997 | Minameda et al. | 52/793.1 |
| 5,664,826 A | * 9/1997 | Wilkens | 296/181 |
| 5,681,095 A | * 10/1997 | Martin | 296/183 |
| 5,769,478 A | * 6/1998 | Vernese | 296/181 |
| 5,791,726 A | * 8/1998 | Kaufman | 296/181 |

\* cited by examiner

Primary Examiner—Joseph D. Pape
Assistant Examiner—Kiran B. Patel
(74) Attorney, Agent, or Firm—Carlson, Gaskey & Olds

(57) ABSTRACT

A vehicle with large side panels includes composite panels that are lightweight and economical to manufacture. A superstructure has a plurality of attached composite panels. In one embodiment, the superstructure has grooves for receiving the composite panels. The composite panels preferably fit together via a tongue and groove configuration. Alternatively, the superstructure has support beams that have threaded receiving holes. Each composite panel then includes threaded inserts aligned with the receiving holes and that attach to the receiving holes. In both embodiments, each composite panel preferably includes at least an outer colored layer, a sheet of polymeric material attached to the colored layer and an inner layer attached to the polymeric material. Other layers can be added depending upon the use of the vehicle. For instance, a layer of insulating foam can be added if the vehicle is to be refrigerated. Further, an additional structural support layer can be added to increase the strength of the walls.

30 Claims, 5 Drawing Sheets

VEHICLE WITH LARGE PLANAR COMPOSITE PANELS

BACKGROUND OF THE INVENTION

This invention generally relates to lightweight body panels used in vehicles having large generally planar panels.

Many vehicles including large trucks, trailers, vans, etc. have large generally planar side panels. Currently, the panels are made of sheets of metal or perhaps plywood attached to a metal superstructure. The metal sheets are typically galvanized steel or stainless steel, Plastic sheet molding compound may be added to the exterior of the assembled superstructure. However, the plastic sheet molding compound needs to be painted. This added step increases the complexity of the assembly and the cost to manufacture the vehicle.

There are several disadvantages to this current manufacturing process. The process is very labor intensive. Further, the panels are very heavy. The heavier the vehicle, the less cargo that can be hauled since there are weight restrictions to preserve and protect the roads.

Therefore, there is a need for more lightweight panels for vehicles to maximize the quantity of goods that can be hauled. There is also a need to simplify the construction and minimize the cost of producing the vehicles.

SUMMARY OF THE INVENTION

A disclosed vehicle uses composite panels to overcome the above problems of standard vehicles made from sheet metal or plywood. In general terms, this invention discloses a lightweight vehicle panel for vehicles having large planar side panels, such as freight trailers, recreational vehicle trailers, step vans, etc. The vehicles preferably include a superstructure and a plurality of layered composite panels that attach to the superstructure.

Each composite panel preferably includes an outer colored layer, a polymeric material attached to the outer colored layer and an inner layer attached to the polymeric material. The panels can also contain more layers as needed for its end use. For instance, a layer of insulating foam can be added. Also, an added layer of structural support can be added anywhere between the outer colored layer and the inner layer. Further, multiple layers of any desired material can be included in each composite panel to meet any required specification.

Preferably, the superstructure includes grooves for receiving the composite panels and the composite panels fit together by a tongue and groove configuration. Alternatively, the superstructure includes support beams having receiving holes. Each composite panel may include threaded inserts aligned with the receiving holes for attachment to the receiving holes.

There are several advantages to using the composite panels of the present invention. Since the panels are made primarily from polymeric materials, they are much lighter than sheet metal. Further, the composite panels do not absorb water like plywood. The panels and superstructure of the present invention are easy to manufacture and assemble compared to the current method of forming the sheet metal and riveting all the pieces together. As a result, the composite panels are less expensive to manufacture. Also, it is less expensive to operate vehicles using the composite panels because the vehicle can haul a heavier load.

These and other features of the invention may be best understood from the following specification and drawings. The following is a brief description of the drawings.

DETAILED DESCRIPTION OF THE PREFERRED EMBODIMENT

Figure 1:
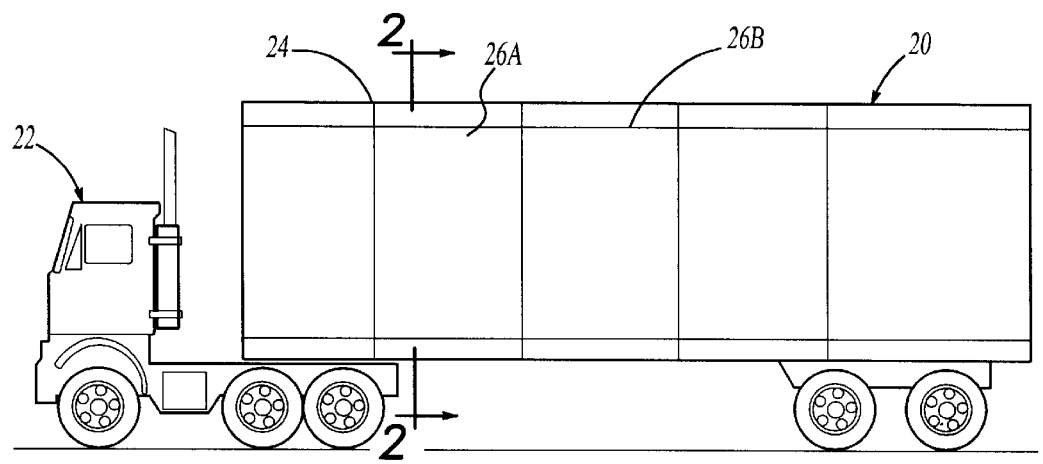
FIG. 1 is an elevational view of a trailer of the present invention attached to a tractor cab.

FIG. 1 illustrates a vehicle trailer, shown generally at 20, being hauled by a tractor cab 22. The trailer 20 includes a superstructure 24 and a plurality of layered composite panels 26 attached to the superstructure 24. The superstructure 24 is preferably made of metal but could alternatively be made from a polymer.

Figure 2:
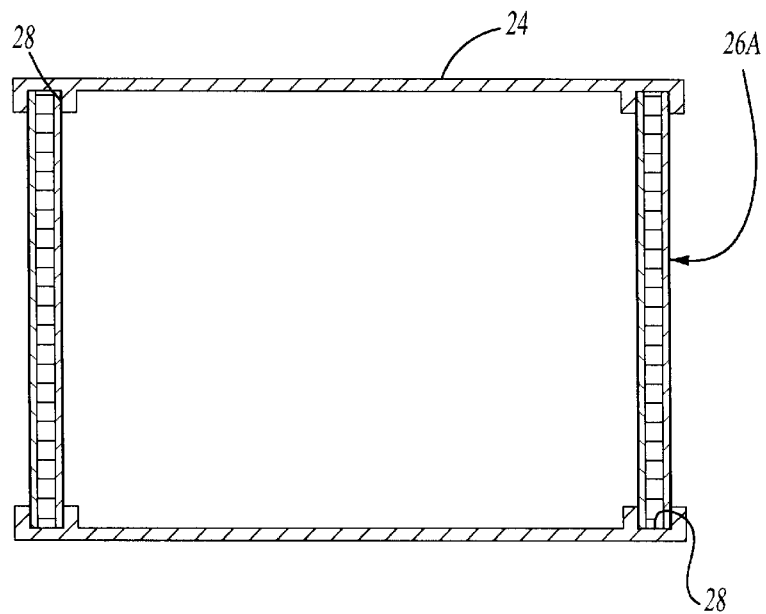
FIG. 2 is a cutaway view along line 2—2 of FIG. 1.
Figure 3:
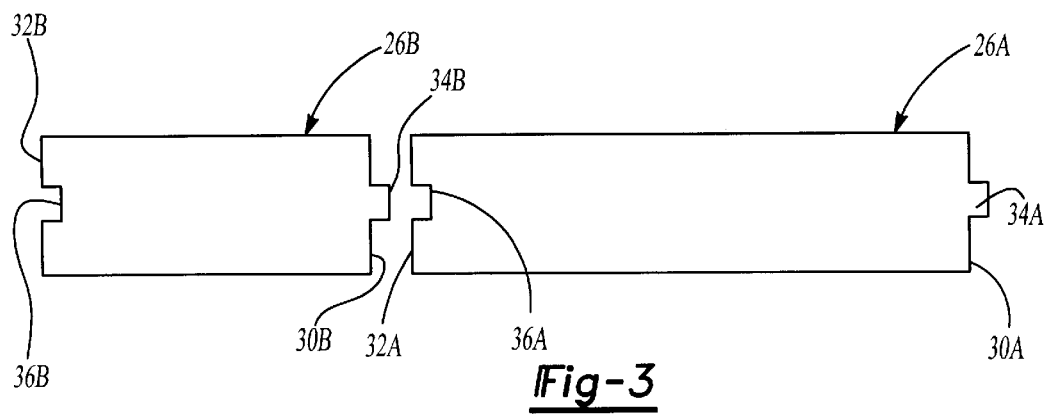
FIG. 3 is a top view of the preferred embodiment showing one attachment method for fitting the composite panels together.

Preferably, as shown in FIG. 2, the superstructure 24 has grooves 28 for receiving the composite panels 26. The composite panels 26 will form the walls of the trailer 20. Further, the composite panels 26 fit together by a tongue and groove arrangement. For example, as shown in FIG. 3, each composite panel 26 has a first edge 30 and a second edge 32. Each panel 26 has a tongue 34 positioned along its first edge 30 and a groove 36 positioned along its second edge 32.

Specifically, a first panel 26A is positioned in the grooves 28 of the superstructure 24 to begin forming the walls of the trailer 20. Next, a second panel 26B is positioned in the grooves 28 of the superstructure 24. The second edge 32A of the first panel 26A abuts a first edge 30B of a second panel 26B. Specifically, the groove 36A of the first panel 26A receives the tongue 34B of the second panel 26B. This continues with other panels 26 until the walls of the trailer 20 are complete.

Figure 4:
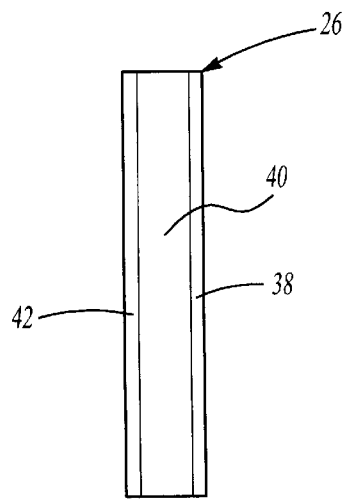
FIG. 4 is a cross-sectional view of one embodiment of a composite panel.

As shown in FIG. 4, preferably, each composite panel 26 includes an outer colored layer 38, a sheet of polymeric material 40 attached to the colored layer 38, and an inner layer 42 attached to the polymeric material 40. Different types of materials can be used for each of the layers.

The outer colored layer 38 is preferably made from a paintless polymer film. Alternatively, a prepainted metal, like aluminum could be used. No painting is required if either of these materials is used as the outer layer 38. Alternatively, an unpainted metal could be used as the outer layer 38. Preferably, the outer layer 38 is positioned in the trailer 20 facing outward.

There are also many options for the polymeric material 40. For instance, the polymeric material can be reinforced. The reinforcements can include reinforcing fibers, integrated support ribs that are molded into the component, or an external framework molded into the material. Further, there is great flexibility with the polymeric material in terms of its thickness.

There are also many options for the inner layer 42. However, the selected material depends on the function of the trailer. For example, metal could be used for the inner layer 42. The metal could be stainless steel, an unpainted metal, or a prepainted metal. A stronger material, like metal, would be used to contain the contents of the trailer and prevent them from breaking through the wall. Another layer of a polymeric material could be used as the inner layer 42 including a paintless film or a textured film. Finally, any type of interior décor could be used including, but not limited to, cloth or wallpaper.

Figure 5:
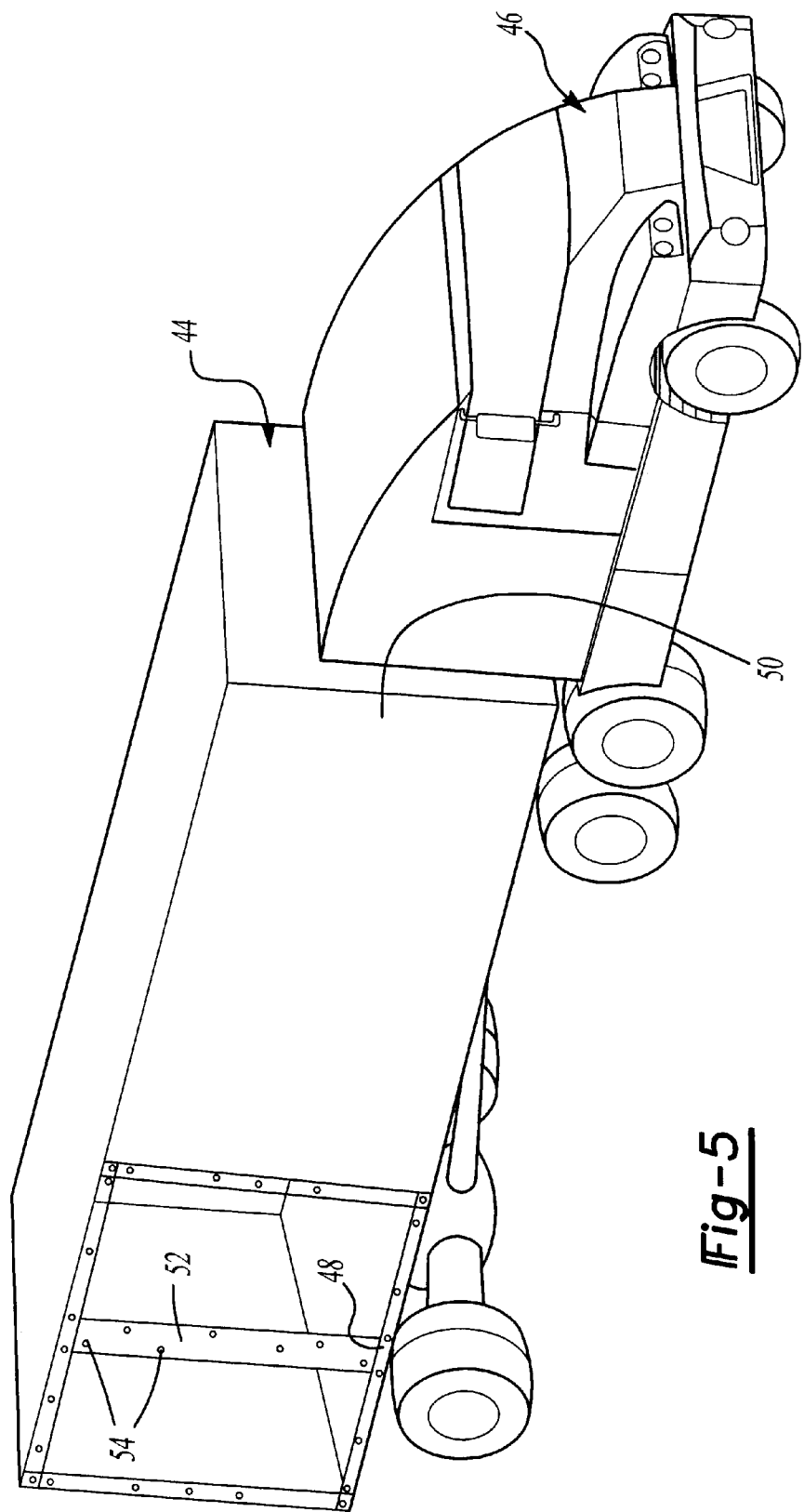
FIG. 5 is a perspective view of an alternative embodiment, showing an alternate attachment method for the panel, shown on a trailer that is attached to a tractor cab.

An alternative embodiment trailer 44 is shown in FIG. 5 being hauled by a tractor cab 46. Similar to the preferred embodiment, the freight trailer 44 includes a superstructure 48 and a plurality of layered composite panels 50 attached to the superstructure 48.

Figure 6:
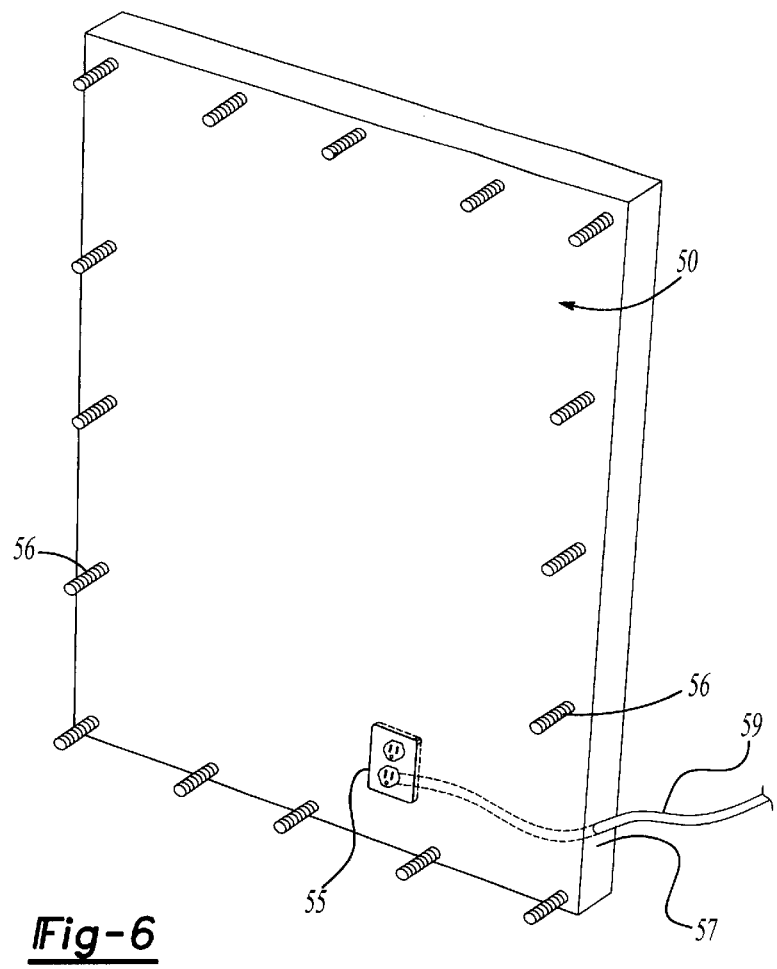
FIG. 6 is a perspective view of the alternative embodiment of FIG. 5 showing the alternate attachment method for the composite panel.

Preferably, the superstructure 48 has support beams 52. Each support beam 52 preferably has at least one threaded receiving hole 54. As shown in FIG. 6, each composite panel 50 includes threaded inserts 56 that are aligned with the receiving holes 54. The threaded inserts 56 engage with the threaded receiving holes 54 to connect the panels 50 to the superstructure 48.

The inserts 56 can be made from either metal or plastic. Further, the inserts 56 are preferably molded into the composite panels 50.

Also shown in FIG. 6 is an electrical outlet 55 and a layer of wiring conduit 57 for holding wires 59, shown partially in phantom, that run throughout the trailer 20, 44.

Figure 7:
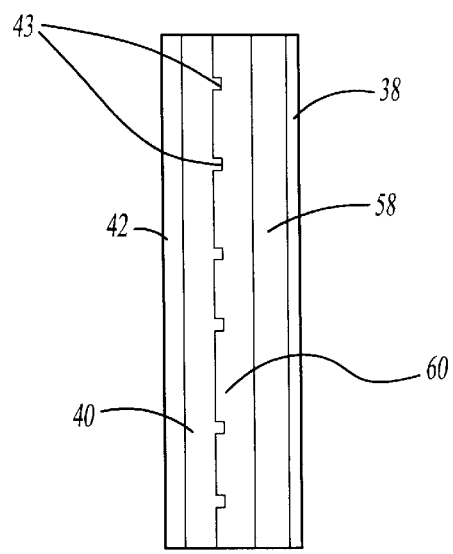
FIG. 7 is a cross-sectional view of an alternative embodiment of a composite panel.

As shown in FIG. 7, preferably, each composite panel includes the same layers that were disclosed in the FIG. 4 embodiment, including an outer colored layer 38, a sheet of polymeric material 40 and an inner layer 42. However, other layers can be added to the composite panels. Some or all of the following options can be used. For instance, a layer of insulating foam 58 can be added and/or an additional structural support layer 60 can also be included in the composite panel. A layer can also be added to act as a vapor barrier.

A thermal insulating foam can be used if the trailer will be refrigerated. The insulating foam can be fiberglass insulation. Alternatively or additionally, depending upon the end user's requirements, an acoustical foam can be used. Also, the thickness of the insulating foam can be adjusted according to the end user's requirements.

A separate structural support layer 60 can be added to the panel. Alternatively, support ribs 43 can be molded directly into the panel. Additional structural support may be necessary to prevent the contents in the trailer from breaking through the panels when the vehicle turns.

A wire conduit layer can be included in the composite panel. Electrical outlets can also be molded into the composite panels. Preferably, the electrical outlets face the interior of the trailer. All of these layers can be used with either the FIG. 4 panels or the FIG. 6 panels.

It is important to note that any of the panels can be used with freight trailers, recreational trailers, step vans, or any other vehicles having large planar side panels.

Figure 8:
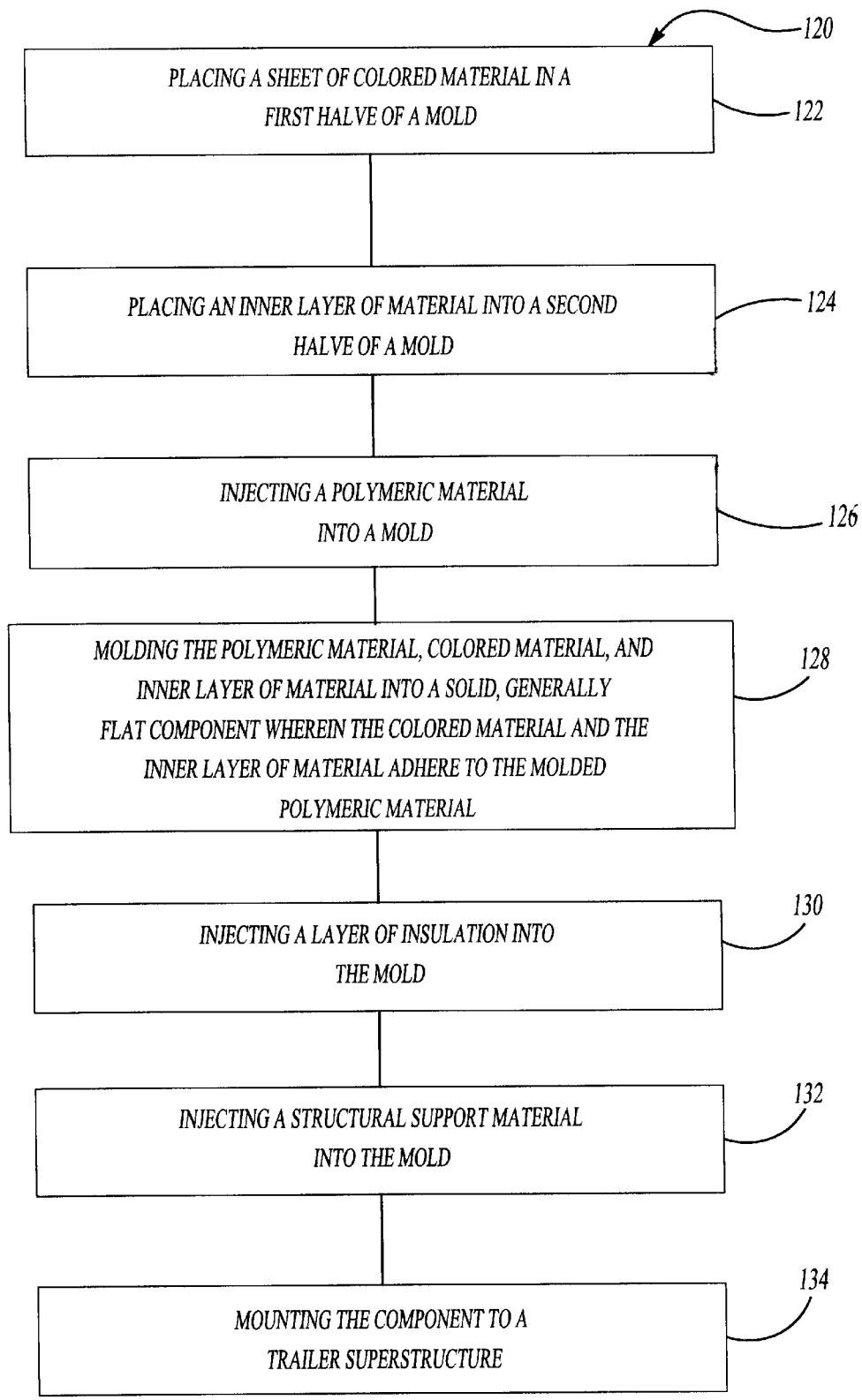
FIG. 8 is a flowchart diagram illustrating the method of making the composite panels and trailer.

FIG. 8 schematically illustrates the method of forming a composite panel for a vehicle. The flow chart 120 includes a first step at 122 where a sheet of colored material is placed in a fast halve of a mold. At 124, an inner layer of material is placed into a second halve of a mold. At 126, a polymeric material is injected into the mold. The polymeric material, colored material and inner layer of material are molded into a solid, generally flat component wherein the colored material and the inner layer of material adhere to the molded polymeric material at 128. At 130, a layer of insulation is injected into the mold. The component could be cured at this point. At 132, a structural support material is injected into the mold. The component could be cured again at this point. At 134, the component is mounted to a vehicle superstructure. Other molding techniques can be used. As an example, rather than plug panels in the mold, a multi-shot molding process can be used. Further, wiring conduit and electrical outlets can be added during the molding process.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A vehicle comprising:
   a superstructure; and
   a plurality of layered composite panels attached to said superstructure wherein each of said layered composite panels comprises an outer colored layer formed from a paintless polymer film and a sheet of polymeric material attached inwardly of said outer colored layer.

2. The vehicle of claim 1 further comprising a layer of insulating foam.

3. The vehicle of claim 2, further comprising a structural support layer.

4. The vehicle of claim 1, wherein said superstructure has grooves for receiving said composite panels and said composite panels fit together by a tongue and groove arrangement.

5. The vehicle of claim 1, wherein said superstructure has support beams including receiving holes and each said composite panel includes inserts aligned with said receiving holes for attaching to said receiving holes.

6. The vehicle of claim 5, wherein said receiving holes and said inserts are both threaded.

7. The vehicle of claim 1, further comprising wiring conduit integrated into said composite panels.

8. The vehicle of claim 7, further comprising electric outlets attached to said panels.

9. The vehicle of claim 1 wherein each said composite panel includes reinforcing ribs.

10. A vehicle comprising:
    a superstructure; and
    a plurality of layered composite panels wherein each said panel includes an outer colored layer formed from a paintless polymer film, a sheet of polymeric material attached to said outer colored layer, a structural support layer attached to said polymeric material, an insulating foam layer attached to said structural support layer, and an inner layer attached to said insulating foam.

11. The vehicle of claim 10, wherein said superstructure has grooves for receiving said composite panels and said composite panels fit together by a tongue and groove arrangement.

12. The vehicle of claim 10, wherein said superstructure has support beams including receiving holes and said composite panel includes inserts aligned with said receiving holes for attaching to said receiving holes.

13. The vehicle of claim 12, wherein said receiving holes and said inserts are both threaded.

14. The vehicle of claim 10, wherein said composite panel further comprises integrated wiring conduit.

15. The vehicle of claim 10, wherein said composite panel further comprises integrated electric outlets connected to said inner layer.

16. A vehicle comprising:

a superstructure, at least one panel for attachment to said superstructure to form the walls of a vehicle trailer each panel including an outer colored layer; and a sheet of polymeric material integrally molded to said colored layer as one piece to form a single panel wherein said outer colored layer is comprised of a paintless polymer film to form a finished outer wall portion of the trailer.

17. The vehicle of claim 16, including an inner layer molded to said sheet of polymeric material on an opposite side from said paintless polymer film to form an inner wall portion of the trailer.

18. The vehicle of claim 17, wherein said inner layer is polymeric material.

19. The vehicle of claim 16 including a male mount on one side of the panel for engaging a first adjacent panel and a female mount on an opposite side of the panel for engaging a second adjacent panel.

20. The vehicle of claim 19, wherein said male mount is comprised of a tongue and said female mount is comprised of a groove.

21. A vehicle comprising:

a superstructure defining a support frame having a plurality of trailer panel support sections;

a plurality of composite panels mounted within said trailer panel support sections, said panels each being formed from an outer colored layer and a sheet of polymeric material integrally molded to said colored layer as one piece wherein said outer colored layer is comprised of a paintless polymer film to form a finished outer surface for said panel.

22. The vehicle of claim 21, wherein said polymeric material is comprised of a fiber-reinforced polymer.

23. The vehicle of claim 21, including an inner layer molded to said sheet of polymeric material on an opposite side from said outer colored layer to form an inner surface of said panel.

24. The vehicle of claim 21, wherein each panel includes a male mount on one side of said panel for connecting to a first adjacent panel and a female mount on an opposite side of said panel for engaging a second adjacent panel.

25. The vehicle of claim 24, wherein said male mount is comprised of a tongue and said female mount is comprised of a groove.

26. The vehicle of claim 21, wherein said outer colored layer and a sheet of polymeric material are molded within a common mold to form each of said panels.

27. The vehicle of claim 21 wherein trailer panel support sections are formed from support beams having a plurality of receiving holes and wherein each of said panels includes a plurality of inserts that align with said receiving holes to attach said panels to said superstructure to form the trailer.

28. The vehicle of claim 27 wherein said inserts are integrally molded with said panel as one piece.

29. The vehicle of claim 21 including at least one electrical outlet and wiring conduit molded within at least one of said panels.

30. The vehicle of claim 21 including a plurality of support ribs molded into said panels.

* * * * *